April 30, 1935.  H. I. RICHARDS  1,999,638
TOBACCO HARVESTER
Filed Jan. 27, 1932  4 Sheets-Sheet 1
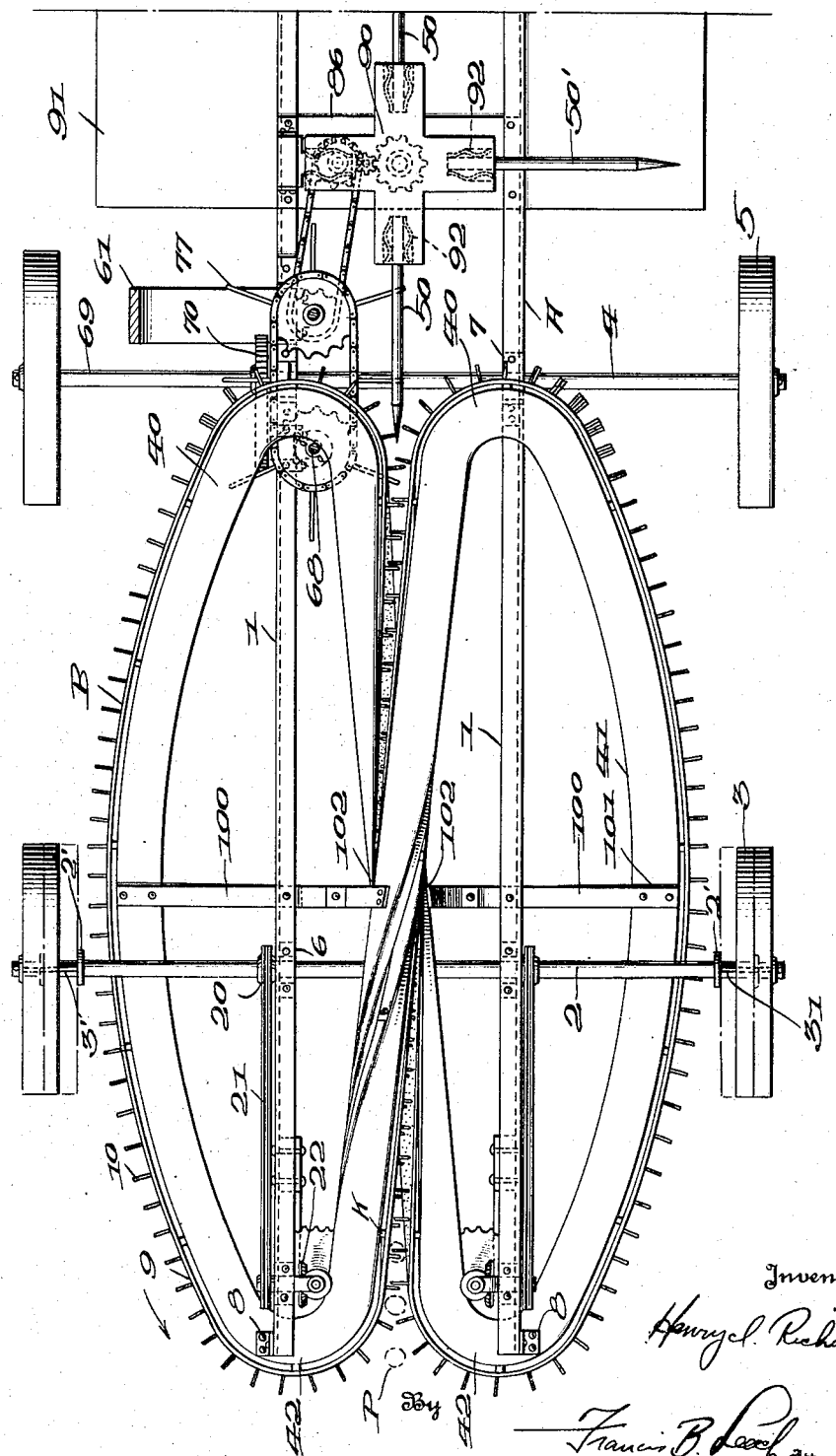

April 30, 1935.  H. I. RICHARDS  1,999,638
TOBACCO HARVESTER
Filed Jan. 27, 1932  4 Sheets-Sheet 2
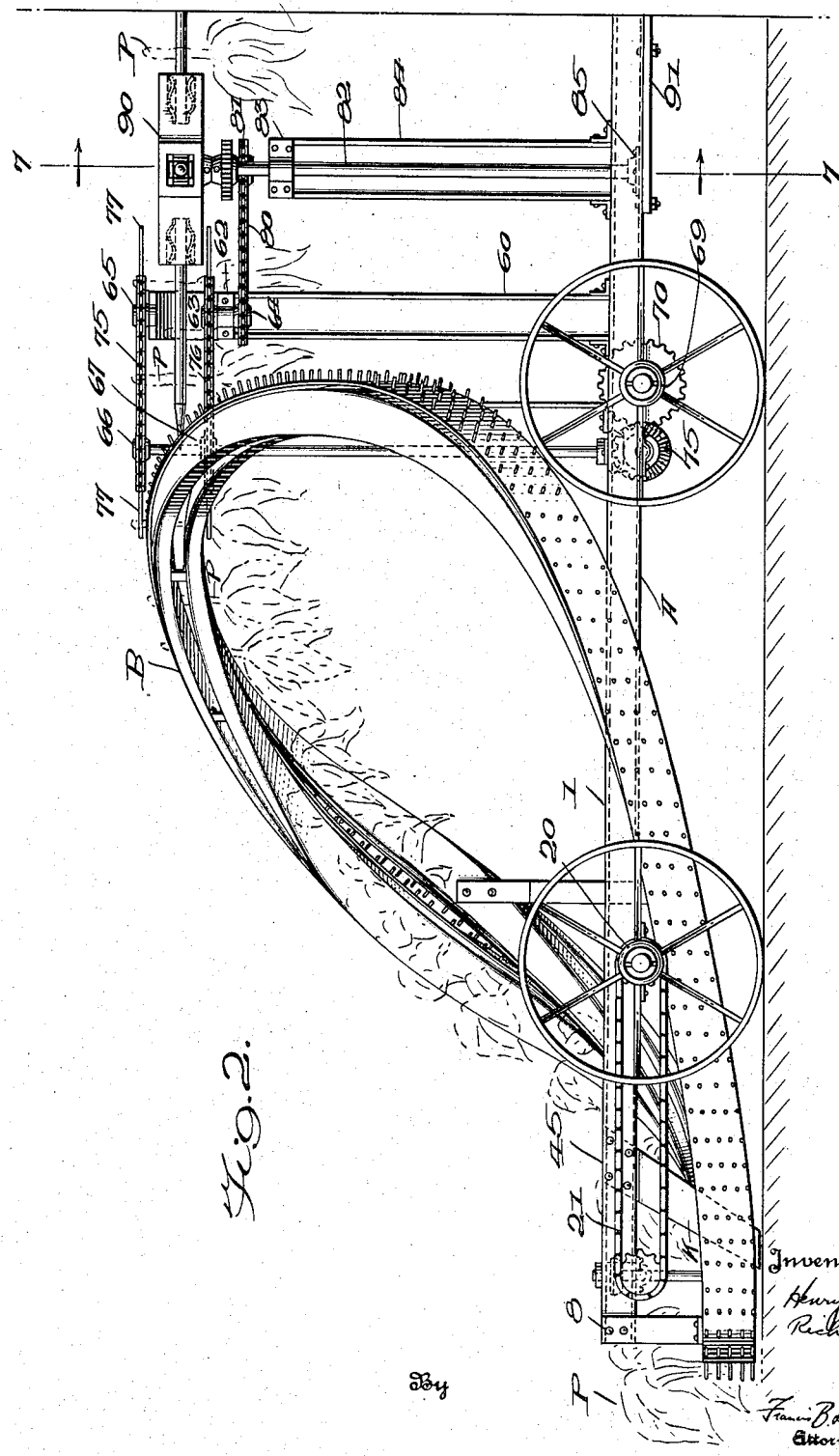

April 30, 1935.  H. I. RICHARDS  1,999,638
TOBACCO HARVESTER
Filed Jan. 27, 1932   4 Sheets-Sheet 3
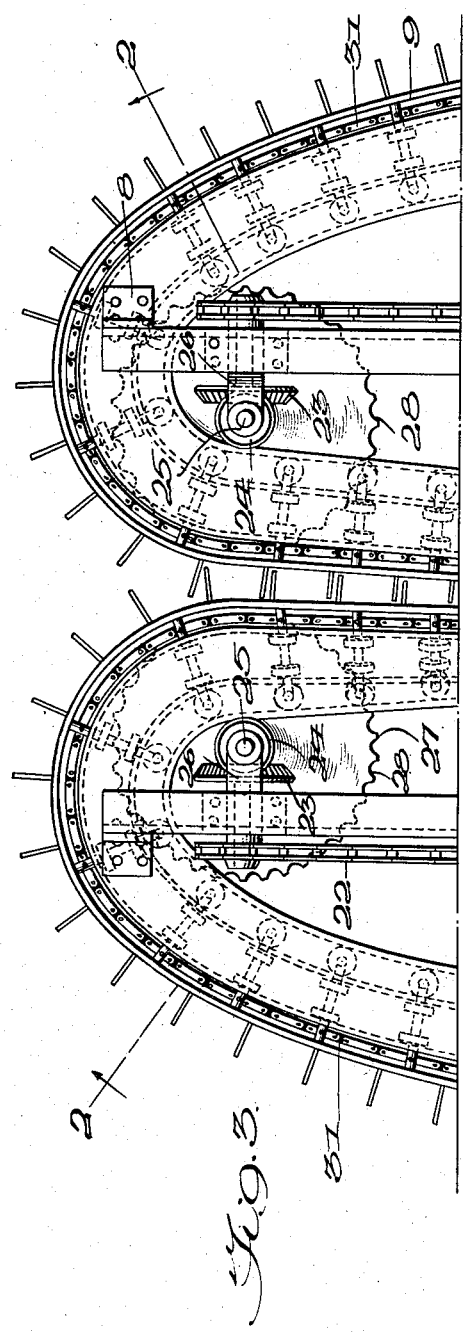
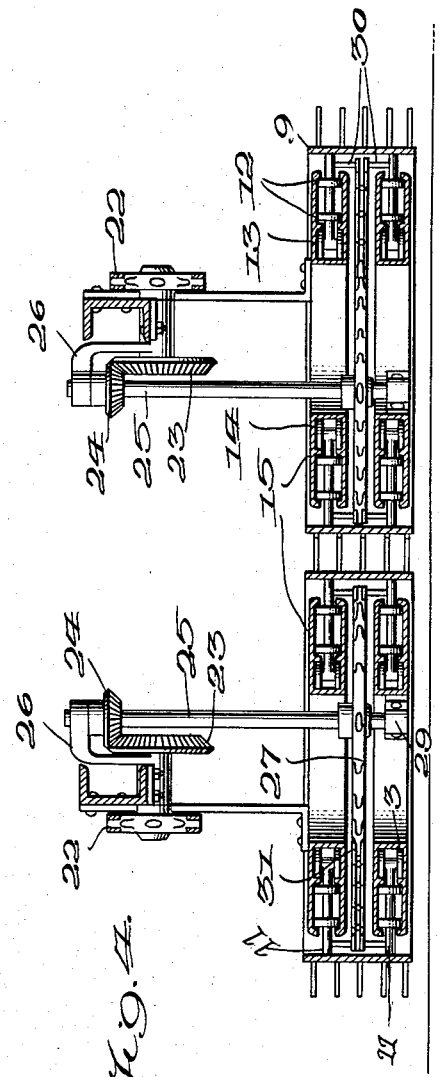

April 30, 1935.  H. I. RICHARDS  1,999,638
TOBACCO HARVESTER
Filed Jan. 27, 1932  4 Sheets-Sheet 4
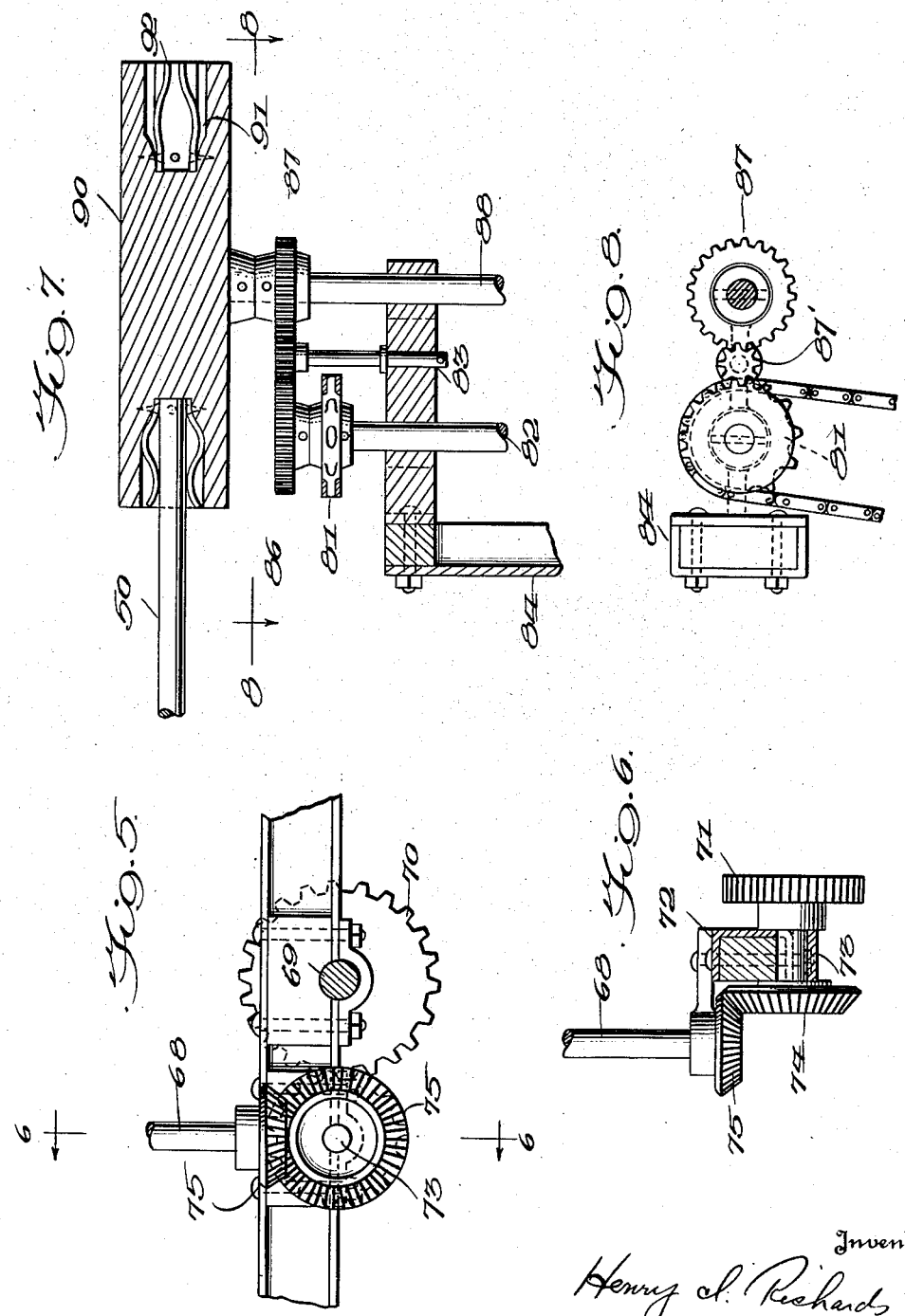

Patented Apr. 30, 1935

1,999,638

UNITED STATES PATENT OFFICE 1,999,638

TOBACCO HARVESTER

Henry I. Richards, Washington, D. C.

Application January 27, 1932, Serial No. 589,272

13 Claims. (Cl. 131—21)

This invention relates to a tobacco harvester.

An object of this invention is to construct a machine for harvesting tobacco whereby the tobacco stalks are cut near the ground and carried by a conveyor to a station where the stalks are placed on tobacco sticks, the several operations taking place without the plants ever contacting with the soil and without manual operation.

A further object of the invention is to orient or invert the plants during their course of travel from the cutting implement to the station where they are placed on the tobacco sticks so that they are placed on the sticks with the foliage portion of the plant hanging downward, after which sticks containing a number of equally spaced plants may be hung on the usual racks in tobacco barns.

Heretofore it has been customary for laborers to work through a tobacco patch and manually cut the stalks of tobacco allowing the plants to lie on the soil until such time as they are gathered. Generally, the gathering consists in a laborer walking along with a hooked stick with which he gathers together a number of plants in the hook and drags them to some convenient point where the plants are inverted, and with the stalks upward, split with a knife and placed or threaded onto tobacco sticks. It is the usual custom to make tobacco sticks from straight hardwood rods about 4 feet long and from ½ to ¾ inches in diameter, sharpened at one end to facilitate stringing several plants on a stick. After a sufficient number of plants, generally 6, have been equally placed on the stick, the sticks are positioned on parallel rack bars in a tobacco drying barn.

It will be apparent from this outline of the prior practise that any number of plants are damaged in dragging them to the place where they are placed on the sticks. In many instances the best leaves of the plant are torn off and even when this does not happen the plant is usually filled with dirt and gravel.

By the use of the present invention, tobacco plants are easily and expeditiously harvested by being uniformly cut off just about the level of the soil, oriented or inverted during their travel through the machine and placed on tobacco sticks in spaced relation without human agency. After a tobacco stick has been filled with plants, a new stick automatically positions itself at the proper point and the filled stick is manually removed. The machine may be either pulled down the rows by a conveniently offset draft gear or may be pushed down the row by a tractor.

In the drawings, Fig. 1 is a top plan elevation of the machine.

Fig. 2 is a side elevation of the complete machine.

Fig. 3 is a detail view of the front portion of the conveyor with its driving and supporting mechanism.

Fig. 4 is a view of the conveyor driving and supporting mechanism partly in cross-section taken on line 2—2 of Fig. 3.

Figs. 5 and 6 are detail views of the gearing for driving the spacing and turret mechanism, while Figs. 7 and 8 are details of the tobacco stick turret and spacing mechanism.

Character A denotes a body frame or chassis composed of parallel channel bars 1 retained in spaced position by rotating axles 2 and 4, the axles being provided with supporting and drive wheels 3 and 5 so that the device may be readily propelled; the pair of wheels 3 on shaft 2 being also provided with keys 3' and stops 2' so that a certain amount of side play of the gathering mechanism is permitted to allow for harvesting stalks of tobacco slightly out of alignment in the row. The rotating axles are attached to the frame by means of brackets 6 and 7.

Carried by the frame A is the tobacco gatherer and conveyor B whose lower end lies below and in front of the forward portion of the frame A and is supported in this position by angle brackets 8.

By referring to Fig. 2, it will be seen that the conveyor B is composed of a continuous flexible metallic band 9 having spaced pins or spikes 10 attached to its outer surface. The conveyor is in the form of a compressed figure 8 so that its central portion from the front to the rear of the machine comprises portions of the belt lying in spaced parallel relation. The path of the conveyor lies from beyond and below the forward portion of the frame and ascends to a considerable height towards the rear of the machine.

To guide the conveyor belt 9, it is supported throughout its entire length by an anti-friction supporting device, the details of which are fully shown in Figs. 3 and 4. From these figures it will be seen that the inner face of the belt throughout its entire length is supported on a plurality of posts 11, the ends of which bear against the inner face of the belt and are secured thereto by spot-welding or other suitable means. Posts 11 have anti-friction rollers 12 positioned around them which ride in U-shaped troughs 13 to prevent lateral movement of the posts. On the other end of the post are journalled rollers 14 which bear against the bottom of the trough 13, and these rollers are prevented from transverse movement by the flanges 15 rolled into the side walls of the troughs.

Movement is given to the conveyor belt by a power drive derived from the front movable axle 2. Adjacent each side of the frame and attached to the axle is a sprocket 20 provided with a chain 21 which is geared to a second sprocket 22 mounted near the forward end of the parallel bars 1. This sprocket 22 is attached to a shaft bracketed to the forward ends of the frame and lying parallel with the ground, and at the other end of which is attached bevel gear 23 meshing with bevel gear 24 carrying vertical shaft 25. Fig. 4 illustrates the details of this construction together with its supporting bracket 26.

Adjacent the lower end of vertical shaft 25 is splined a large toothed drive wheel 27 while the end of the shaft is journalled in a bracket 29 to prevent its lateral movement.

To distribute the power applied to the endless metallic band 9, two series of troughs 13 are installed to insure a constant distribution throughout the width of the band and between each upper and lower post 11 are pins 30 which are attached to a link belt 31 which follows the contour of the conveyor throughout its entire length.

As the machine is moved forward, power from wheel 3 and rotating axle 2 is transmitted by sprockets 20, chains 21 and sprockets 22 to vertical shafts 25 and gear wheels 27. The indentations 28 on the gear wheels contact with the links of the chain 31 and drive the chain in synchronism, it being understood, of course, that one gear wheel 22 revolves in clockwise while the other in counterclockwise direction.

The pins or spikes 10 on the outer surface of the belt 9 lie close together throughout their movement from the front to the rear of the central portion of the conveyor flight, and, as illustrated, the pins are arranged in oblique rows on the belt surfaces.

It will be noted from Figs. 1 and 2 that during the ascent of the central portion of the conveyor sections above the frame A that the troughs 13 gradually turn so that towards the center of the machine they have completely reversed their position and this movement consequently changes or reverses the position of the conveyor 9. As this reversal is completed, the central portions of the conveyor and its guides or troughs tend to spread and move away from each other so that the pins 10 are carried around the outside curved surfaces 40 at the rear of the machine and throughout the remainder of travel of the belt over the curved side troughs 41.

The forward ends 42 of the troughs are curved on a similar radius to the rear curve 40 of the troughs and it is noticed that as the sections of the conveyor belt, with its associated pins, tend to converge from the front of the machine back a short distance so that the belts space themselves slightly in excess of the length of the pins. The troughs and bands are supported by struts or braces 100 which extend transversely from the frame B and are united to the outer troughs at 101 and to the central turning portion of the troughs by angle sections at 102.

As the machine is moved forward, it is centered on either side of a row of tobacco plants, and in Fig. 1 the plants are diagrammatically indicated by the letter P. The pins on either section of the conveyor penetrate the stalks of the plant and simultaneously with their penetration the fixed knife K, securely attached to the frame at 45, cuts the stalks of the plants just above the ground. Continued forward movement of the machine operates the endless conveyor with its parallel bands to carry the plant backward and upward and also to invert or orient from its original position. By the time the plant has reached the rear portion of the machine, it is being carried stalk upward and is presented to the tobacco stick 50 in this position.

Inasmuch as in practical operation it is very seldom that tobacco plants are laid out in absolutely straight rows and to compensate for slight unevenness in the rows, the front wheels of this tobacco harvester are permitted a certain amount of lateral movement. The front axles 2 have stop collars 2' affixed near their ends together with a key 3' which extends from the stop collar to the end of the axle, the hubs of the wheels 3 being also slotted to accommodate this key and to slide freely from the stop collar to the outer cotter-pin. Due to this construction of the front axles, together with the flexibiliy of the side frames 1, the front end of the conveyor flexes slightly from side to side when it comes in contact with tobacco plants which are slightly to either side of the center of forward movement and thus all plants in the row are gathered.

Mounted directly behind the conveyor belt and affixed to the frame 1 is a vertical standard 60 whose upper end is U-shaped at 61 to provide sufficient clearance for the rotation of tobacco sticks 50. Journalled slightly below the U-shaped section 61 on the standard 60 is a shaft 62 having upper and lower sprocket wheels 63 and 64. There is also a sprocket wheel mounted on the upper edge of the U-shaped bracket 61, this upper sprocket being designated by numeral 65.

Both of the sprockets 63 and 65 are geared to sprockets 66 and 67 respectively, which are attached to and rotated by shaft 68 which receives power from the rear-axle 4 and carrying gear 70. The shaft 73 journalled onto the frame by bracket 72 carries gear 71 meshing with gear 70 and mounted on its opposite end is bevel gear 74 which meshes with bevel gear 75 affixed to the bottom of shaft 68.

The power transmitted through vertical shaft 68 and sprockets 66 and 67 is carried to sprockets 65 and 63 respectively through chains 75 and 76. Each of these power chains carries a plurality of pusher and spacer arms 77. The arms on the upper and lower chains are mounted directly above one another.

The sprocket 64, held by shaft 62 on standard 60, receives its power from sprocket 63 and transmits this power through chain 80 to sprocket 81 mounted on vertical shaft 82. The shaft 82 is supported near its upper end through horizontal plate 83 bolted to vertical standard 84 attached to and carried on the rear section of the frame. The lower end of the shaft 82 rests in a lower bed bearing 85. Attached to the upper end of the shaft 82 above the sprocket 81 is the interrupted tooth gear 86 whose teeth mesh with reversing gear 87' and drive gear 87 carried on vertical shaft 88 which is also supported by plate 83. The lower end of vertical shaft 88 is supported on the frame in a similar manner to shaft 82. The details of this construction are illustrated in Fig. 7.

Attached to the upper end of shaft 88 and rotated with gear 87 is the turret 90. This turret consists of a rotating cross, each arm of which contains a socket 91 in which is mounted spring fingers 92 for the purpose of grasping the base of a tobacco stick 50. The spring fingers 92 resiliently grasp the end of the tobacco stick and while holding it firmly the stick may be readily inserted or removed by the operator. The timing of the rotation of the turret 90 is of considerable importance as it is necessary to hold the empty tobacco stick 50 in the position shown in Fig. 1 for a sufficient length of time for 6 tobacco stalks to be threaded onto the tobacco stick. The tobacco plants which are being carried by the conveyor, as they reach the rear of the machine, contact with the pointed outer end of the tobacco stick at which time the pusher arms 77 strike the tobacco plant above and below the stick and force the plant onto the stick. The stick remains in this position until it has received its supply of stalks, generally 6, and after the plants are forced thereon by the pair of arms 77, the stalks are uniformly spaced throughout the length of the stick by the spacing of the arms 77.

Immediately upon receiving the 6 plants (or any other suitable number) the timing mechanism of the turret comes into play. By referring to Fig. 8 it will be seen that only ¼ of the teeth have been left on gear 86 so that it can only turn turret gear 87, ¼ of a revolution while ¾ of its rotation does not mesh. Consequently, the timing is such that the turret is rotated 90° to carry a new stick into operable position. After the stick has been filled, it moves 90° away from its former position and the operator standing on platform 95 removes the filled stick and places it on suitable racks which are conveyed to the tobacco barn and hung up. Upon removing the filled stick, the operator inserts an unfilled stick into the socket of the turret and keeps removing and filling throughout the entire working of the machine.

What I claim is:

1. In a tobacco plant harvester, the combination of a wheeled frame, a driven conveyor provided with plant impaling pins on one face mounted thereon for conveying plants from the forward end of said frame towards the rearward end of said frame, and mechanism adjacent the rearward end of said frame for removing and storing the plants carried by said conveyor.

2. In a tobacco harvester having a wheeled vehicle adapted to be moved down a row of tobacco plants, a knife carried by said vehicle for cutting successive tobacco plants in said row, oppositely spaced moving bands carried on said vehicle grasping said plants simultaneously with their contact with the knife, said bands conveying said cut plants upwardly and backwardly, during the course of which the bands are rotated 180° to discharge the plants from the bands in an inverted position from that to which they were when cut.

3. In a tobacco harvester, the combination of a movable wheeled frame, a knife affixed to the forward portion of said frame, a spaced conveyor provided with impaling means adjacent said knife for positively moving tobacco plants cut thereby to a point remote therefrom, and a plant gatherer positioned adjacent said remote point and receiving plants from said conveyor.

4. In a tobacco harvester, a wheeled movable frame supporting a knife, a spaced endless single belt conveyor and a gatherer, the said gatherer receiving material from said endless conveyor after being cut by said knife, and a predetermined intermittent drive for said gatherer operable when the gatherer has gathered its capacity of material.

5. In a tobacco harvester, a frame supported on front and rear wheels carried by rotating axles, an endless conveyor mounted on said frame with its leading portion below and beyond the front edge of the frame; the opposite portion of said conveyor being supported above and toward the rear of said frame; the conveyor being positively driven by power take-off means coupled to the front wheel rotating axle through the medium of a sprocket engaging the rear surface of the conveyor.

6. In a machine of the character described, a portable endless band conveyor carried on a wheeled frame, power driving means for said conveyor, a storage turret carried on the wheeled frame to the rear of said conveyor, transfer mechanism comprising upper and lower moving fingers for removing material from the conveyor to the storage turret.

7. A tobacco plant harvester having in combination, means for cutting and gathering tobacco plants, a conveyor moving cut plants to a positively driven transfer mechanism, the said transfer mechanism transferring plants from said conveyor to a tobacco stick carried on a rotating turret and interrupted driving means for said turret, synchronized with the said transfer mechanism for presenting a succession of tobacco sticks thereto.

8. A tobacco plant harvester including a movable wheeled frame, plant severing means carried thereby, an endless conveyor supported on said frame and guided throughout its entire length by a trough-like support having the outline of a compressed figure 8.

9. In a tobacco harvester, a wheeled frame, a knife mounted on said frame and a rigidly supported flexible conveyor belt carried on a guide affixed to the frame, the said guide presenting the forward portion of the conveyor belt parallel to and adjacent the ground, reversing the path of travel of the middle portion of the conveyor and elevating the rear portion thereof.

10. In a tobacco harvester, a frame carrying an endless conveyor, means to present cut tobacco plants thereto, the conveyor being provided with impaling devices on one surface and positive drive elements on the reverse surface.

11. A tobacco plant harvester having an endless conveyor adapted to convey tobacco plants from a severing device to a gathering mechanism, the endless conveyor being positively driven at its forward ends by a sprocket wheel, the teeth of which engage vertical pins carried between horizontal rods affixed to the face of the conveyor.

12. In a tobacco harvester, the combination of a wheeled frame, a knife mounted thereon, an endless conveyor having spaced parallel movement throughout a portion of its length carried on said frame, driving means for said conveyor and a continuous guide frame supporting the endless conveyor throughout its entire length.

13. A tobacco harvester including a wheeled frame, a plant cutter carried on the forward portion thereof, a conveyor receiving cut plants from adjacent the cutter, the conveyor comprising a single endless belt provided with plant holding means on one surface thereof and a continuous guide supporting said belt throughout its length, the guide being of figure 8 formation with two rounded portions spaced apart at the front of the harvester and belt drive means mounted within these rounded portions.

HENRY I. RICHARDS.